(12) United States Patent
Belmont et al.

(10) Patent No.: US 9,384,010 B2
(45) Date of Patent: *Jul. 5, 2016

(54) DYNAMIC CORE SWAPPING

(71) Applicant: Intel Corporation, Santa Clara, CA (US)

(72) Inventors: Brian V. Belmont, Loomis, CA (US); Animesh Mishra, Pleasanton, CA (US); James P. Kardach, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/578,885

(22) Filed: Dec. 22, 2014

(65) Prior Publication Data

US 2015/0178098 A1 Jun. 25, 2015

Related U.S. Application Data

(63) Continuation of application No. 13/938,150, filed on Jul. 9, 2013, now Pat. No. 8,949,633, which is a continuation of application No. 12/326,775, filed on Dec. 2, 2008, now Pat. No. 8,484,488, which is a continuation of application No. 11/241,376, filed on Sep. 30, 2005, now Pat. No. 7,461,275.

(51) Int. Cl.
*G06F 1/32* (2006.01)
*G06F 1/00* (2006.01)
*G06F 9/44* (2006.01)
*G06F 15/80* (2006.01)
(Continued)

(52) U.S. Cl.
CPC ............ *G06F 9/4418* (2013.01); *G06F 1/3228* (2013.01); *G06F 1/3275* (2013.01); *G06F 1/3293* (2013.01); *G06F 9/3867* (2013.01); *G06F 9/4401* (2013.01); *G06F 12/0842* (2013.01); *G06F 13/4282* (2013.01); *G06F 15/80* (2013.01)

(58) Field of Classification Search
CPC .................................................... G06F 1/3203
USPC ........................................................ 713/320
See application file for complete search history.

(56) References Cited

U.S. PATENT DOCUMENTS 5,142,684 A 8/1992 Perry et al.
6,035,408 A 3/2000 Huang
(Continued)

OTHER PUBLICATIONS

Non-Final Office Action for U.S. Appl. No. 11/241,376, Mailed Apr. 7, 2008, 11 pages.

(Continued)

*Primary Examiner* — Suresh Suryawanshi
(74) *Attorney, Agent, or Firm* — Trop, Pruner & Hu, P.C.

(57) ABSTRACT

An embodiment of the present invention is a technique to dynamically swap processor cores. A first core has a first instruction set. The first core executes a program at a first performance level. The first core stops executing the program when a triggering event occurs. A second core has a second instruction set compatible with the first instruction set and has a second performance level different than the first performance level. The second core is in a power down state when the first core is executing the program. A circuit powers up the second core after the first core stops executing the program such that the second core continues executing the program at the second performance level.

9 Claims, 7 Drawing Sheets

(51) Int. Cl.
*G06F 9/38* (2006.01)
*G06F 12/08* (2016.01)
*G06F 13/42* (2006.01)

(56) References Cited

U.S. PATENT DOCUMENTS

| | | | |
|---|---|---|---|
| 6,099,583 A * | 8/2000 | Nag | 716/117 |
| 6,240,521 B1 | 5/2001 | Barber et al. | |
| 6,496,919 B1 * | 12/2002 | Nishimoto et al. | 712/24 |
| 6,501,999 B1 | 12/2002 | Cai | |
| 6,631,474 B1 | 10/2003 | Cai et al. | |
| 6,725,354 B1 | 4/2004 | Kahle et al. | |
| 6,804,632 B2 | 10/2004 | Orenstien et al. | |
| 6,836,850 B2 | 12/2004 | Cheng | |
| 7,043,405 B2 | 5/2006 | Orenstien et al. | |
| 7,073,094 B1 * | 7/2006 | Jackson et al. | 714/30 |
| 7,093,147 B2 | 8/2006 | Farkas et al. | |
| 7,100,060 B2 | 8/2006 | Cai et al. | |
| 7,437,581 B2 | 10/2008 | Grochowski et al. | |
| 7,519,049 B2 | 4/2009 | Masuda | |
| 7,966,511 B2 * | 6/2011 | Naveh et al. | 713/501 |
| 2003/0065497 A1 | 4/2003 | Rhoads | |

OTHER PUBLICATIONS

Notice of Allowance for U.S. Appl. No. 11/241,376, Mailed Jul. 28, 2008, 4 pages.

Office Action mailed Jun. 28, 2011, in U.S. Appl. No. 12/326,775, 12 pages.

U.S. Appl. No. 14/572,366, filed Dec. 16, 2014, entitled "Dynamic Core Swapping," by Brian V. Belmont, et al.

United States Patent and Trademark Office, Office Action mailed Oct. 9, 2015 in U.S. Appl. No. 14/572,366.

United States Patent and Trademark Office, Reply to Office Action filed on Jan. 6, 2016 in U.S. Appl. No. 14/572,366.

\* cited by examiner

DYNAMIC CORE SWAPPING

CROSS-REFERENCE TO RELATED APPLICATIONS

This application is a continuation of U.S. patent application Ser. No. 13/938,150, filed Jul. 9, 2013, which is a continuation of U.S. patent application Ser. No. 12/326,775, filed Dec. 2, 2008, now U.S. Pat. No. 8,484,488, issued on Jul. 9, 2013, which is a continuation of U.S. patent application Ser. No. 11/241,376 filed on Sep. 30, 2005, now U.S. Pat. No. 7,461,275, issued Dec. 2, 2008. These applications are incorporated herein by reference in their entireties.

BACKGROUND

1. Field of the Invention

Embodiments of the invention relate to the field of microprocessors, and more specifically, to multi-core processors.

2. Description of Related Art

Microprocessor cores may vary significantly in their power consumption based on their architecture, voltage, operating frequency, and performance characteristics. A processor core designed for high performance typically consumes more power than a low performance core that is optimized for power. In addition, a platform or system having processor core or cores may have many usage environments, each with different requirements and operating criteria. For example, in mobile platform, a high performance core is desired for operation when the platform is connected to a fixed infrastructure power network, such as when the mobile platform is docked to a desktop personal computer (PC) for data synchronization. However, when it is used in a battery mode, a low performance with low power consumption is preferred. A fixed microprocessor core with fixed performance characteristics may not be able to accommodate different usage conditions.

Existing techniques to address the above problem have a number of drawbacks. The most common approach is to design a processor core that may operate in a wide frequency range corresponding to a range of power consumption. The main disadvantage of this approach is that since the core is designed for maximum operating frequency, it may contain a large number of components (e.g., high transistor count). This impacts the core's power consumption even at low frequencies due to leakage from such a large amount of components.

BRIEF DESCRIPTION OF THE DRAWINGS

Embodiments of invention may best be understood by referring to the following description and accompanying drawings that are used to illustrate embodiments of the invention. In the drawings.

DESCRIPTION

Figure 1A:
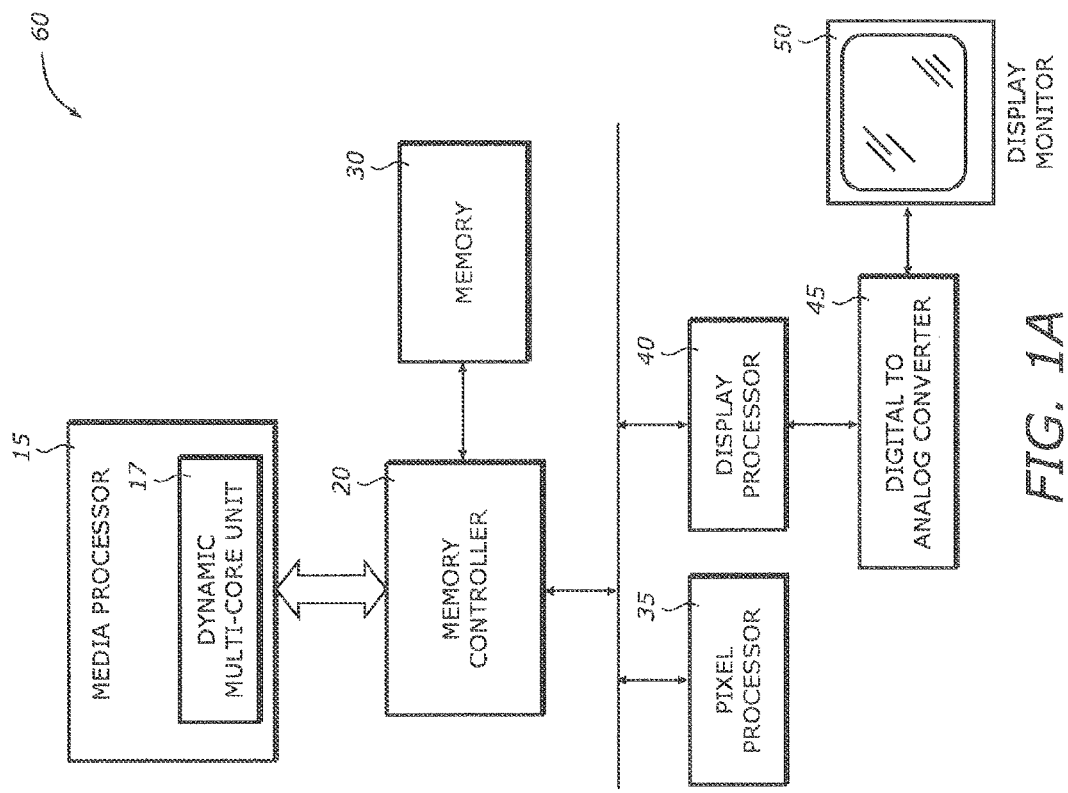
FIG. 1A is a diagram illustrating a media system in which one embodiment of the invention can be practiced.

An embodiment of the present invention is a technique to dynamically swap processor cores. A first core has a first instruction set. The first core executes a program at a first performance level. The first core stops executing the program when a triggering event occurs. A second core has a second instruction set compatible with the first instruction set and has a second performance level different than the first performance level. The second core is in a power down state when the first core is executing the program. A circuit powers up the second core after the first core stops executing the program such that the second core continues executing the program at the second performance level.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

One embodiment of the invention is a technique to provide different performance levels at different power levels in a computing system. The technique employs multiple processor cores. The multiple cores may be on the same die or different dies, in the same package or different packages, on the same platform or different platforms. They have different performance levels and operate at different power levels corresponding to the performance levels. For example, a core may run fast but at high power level, while another core may run slower but at lower power level. In another example, both cores may consume approximately the same power, but they are optimized for different operations (e.g., floating-point operations versus integer operations). They have instruction sets that are compatible so that any change of the processor core is functionally transparent to the software. At any one time, at most only one core is executing a program. The remaining cores are in power down state waiting to be powered up when core swapping is going to take place. When a triggering event occurs to start the a core swapping, the active core saves its context and processor state such as saving the contents of its register set in memory and flushing the internal cache. It then enters in a power down state. Then, a substitute core is powered up to continue executing the program by restoring the saved processor state.

Embodiments of the invention provide a flexible and dynamic mechanism to provide different performance levels at different power levels according to some system criteria as provided by the triggering event. Embodiments of the invention may have applications in graphics and imaging, video processing, media content creation and distribution, mobile computing, network processing, or any applications that may require different power consumption levels or different performance levels.

FIG. 1A is a diagram illustrating a media system 10 in which one embodiment of the invention can be practiced. The media system 10 includes a media processor 15, a memory controller 20, a memory 30, a pixel processor 35, a display processor 40, a digital-to-analog converter (DAC) 45, and a display monitor 50.

The media processor 15 may be any processor that has graphic/imaging and/or audio processing capabilities to perform graphics/imaging operations such as fast line drawing, two-dimensional (2-D) and three-dimensional (3-D) graphic rendering functions, shading, anti-aliasing, polygon rendering, transparency effect, color space conversion, alpha-blending, chroma-keying, etc. In particular, the media processor 15 includes a dynamic multi-core unit 17 that has multiple cores with dynamic swapping functionalities. In this embodiment, the multiple cores in the multi-core unit 17 may be on the same die. The memory controller 20 performs memory control functions. The memory 30 includes static random access memory (SRAM) or dynamic random access memory (DRAM) memory devices. The memory devices store instructions, data, and/or graphic data processed by the media processor 15.

The pixel processor 35 is a specialized graphic engine that can perform specific and complex graphic functions such as geometry calculations, affine conversions, model view projections, 3-D clipping, etc. The pixel processor 35 is also interfaced to the memory controller 20 to access the memory 30 and/or the media processor 15. The display processor 40 processes displaying the graphic data and performs display-related functions such as palette table look-up, synchronization, backlight controller, video processing, etc. The DAC 45 converts digital display digital data to analog video signal to the display monitor 50. The display monitor 50 is any display monitor that displays the graphic information on the screen for viewing. The display monitor may be a Cathode Ray Tube (CRT) monitor, a television (TV) set, a Liquid Crystal Display (LCD), a Flat Panel, or a Digital CRT.

Figure 1B:
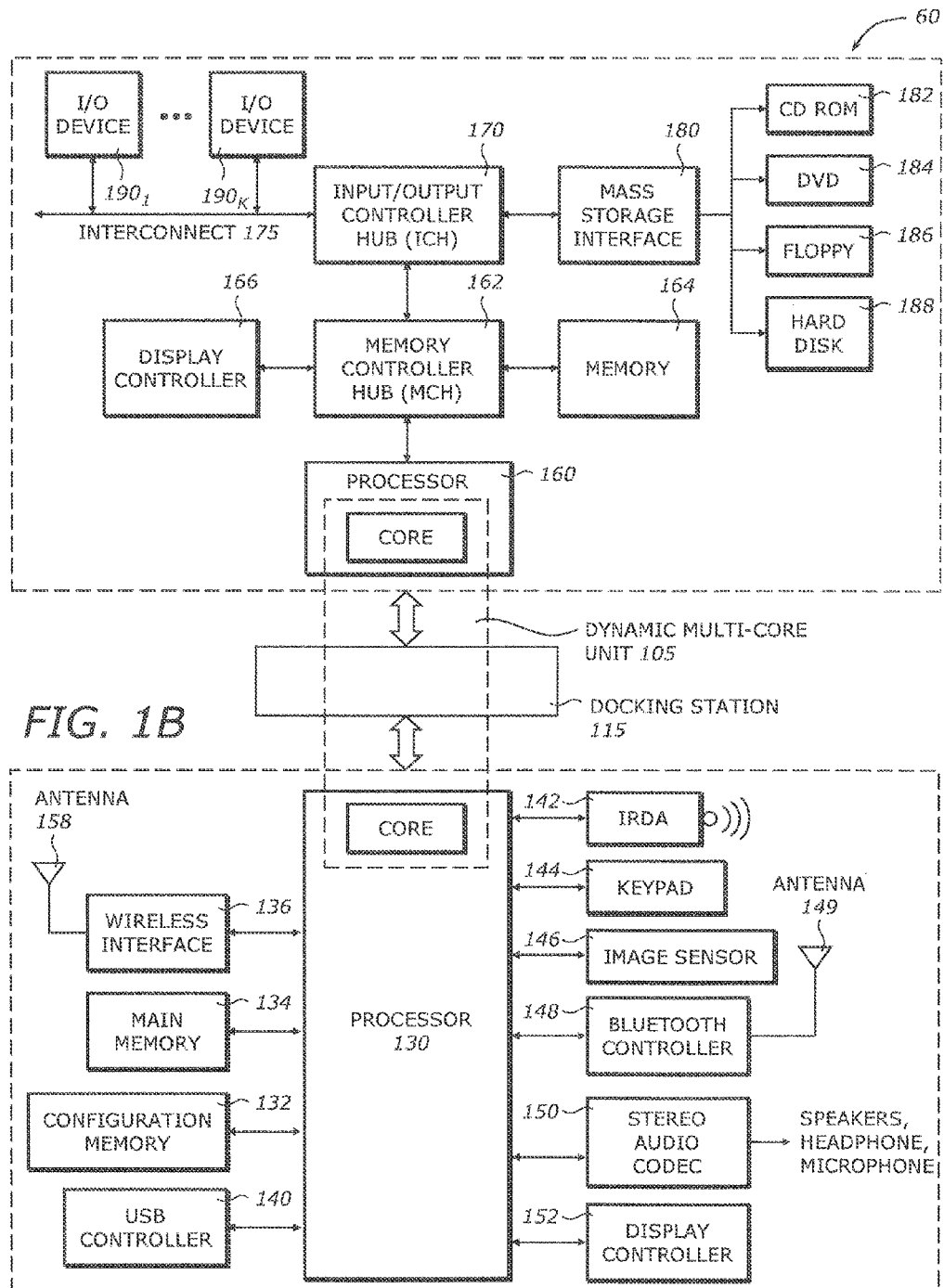
FIG. 1B is a diagram illustrating a system in which one embodiment of the invention can be practiced.

FIG. 1B is a diagram illustrating a processing system 100 in which one embodiment of the invention can be practiced. The system 100 includes a mobile device 110, a docking station 115, and a desktop unit 120.

The mobile device 110 may be any mobile device such as personal digital assistant (PDA), media player (e.g., audio/music player, video player), cellular phone, hand-held device, hand-held computer, camera, game unit, etc. It includes a processor 130, a configuration memory 132, a main memory 134, a wireless interface 136, a Universal Serial Bus (USB) controller 140, an Infrared Data Association (IrDA) interface 142, a keypad 144, an image sensor 146, a Bluetooth controller 148, a stereo audio codec 150, and a display controller 152. The mobile device 10 may include more or less components than the above.

The processor 130 may be any processor with multi-control functionalities. It may be a digital signal processor, a mobile processor, or a micro-controller. It may have input/output ports such as parallel port, serial port, or peripheral bus to interface to external devices. In particular, it may contain a mini core with reduced functionalities for lower performance in exchange for lower power consumption. This mini core is part of a dynamic multi-core unit.

The configuration memory 132 stores configuration data or information to configure the processor 130 in various functional modes. It may be a read-only memory (ROM), a flash memory, or an electrically erasable programmable ROM (EEPROM). It may also contain boot code that boots up the system upon power-up. The main memory 134 may include SRAM, DRAM, or flash memory to store instructions or data. The wireless interface 136 provides wireless connection to a wireless network via an antenna 138. The wireless interface 136 may conform to some wireless standard such as the Institute of Electrical and Electronic Engineers (IEEE) 801.11b.

The USB controller 140 provides USB interface to a USB device. It may have a Plug-and-Play (PnP) functionality. The IrDA interface 142 provides infrared communication to a remote device. The keypad 144 includes buttons or keyboard to allow the user to enter data or commands. The image sensor 146 captures image information. It may be a camera having charged-couple devices (CCD's) acting as image sensing elements. The Bluetooth controller 148 provides wireless functionality through short-range radio link to communicate with Bluetooth-enabled devices via an antenna 149.

The stereo audio codec 150 provides audio or bit stream coding and decoding to create stereo outputs to the left and right stereo speakers, respectively. It also provides audio output to a stereo headphone and receives audio input from a microphone.

The display controller 152 generates data for display on a flat-panel display. It may include a buffer memory to store text and graphics. It may include special circuitry to perform graphic manipulation. The display panel may be a multi-color flat panel display such as an Organic Light Emitting Diode (OLED) or Polymer Light Emitting Diode (PLED) display or Thin-Film Transistor (TFT) Liquid Crystal Display (LCD).

The docking station 115 provides mechanical and electrical interfaces to allow the mobile device 110 to communicate with the desk-top unit 120. It may include serial ports, parallel ports, USB ports, etc. In particular, it includes interface or control circuits to control, manage, or coordinate the processor cores inside the mobile device 110 and the desk-top unit 120.

The desk-top unit 120 may be any desk-top personal computer (PC) that has full functionalities of a computing system. It may include a processor unit 160, a memory controller hub (MCH) 162, a main memory 164, a display controller 166, an input/output controller hub (ICH) 170, an interconnect 175, a mass storage interface 180, and input/output (I/O) devices $190_1$ to $190_K$.

The processor unit 160 represents a central processing unit of any type of architecture, such as processors using hyper threading, security, network, digital media technologies, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. In particular, it includes a maxi core having maximum functionalities compared to the core in the processor 130. This maxi core has a high power consumption but also has a high performance level.

The MCH 162 provides control and configuration of memory and input/output devices such as the main memory 164 and the ICH 170. The MCH 162 may be integrated into a chipset that integrates multiple functionalities such as graphics, media, host-to-peripheral bus interface, memory control, power management, etc. The MCH 162 or the memory controller functionality in the MCH 162 may be integrated in the processor unit 160. In some embodiments, the memory controller, either internal or external to the processor unit 160, may work for all cores or processors in the processor unit 160.

In other embodiments, it may include different portions that may work separately for different cores or processors in the processor unit 160.

The main memory 164 stores system code and data. The main memory 164 is typically implemented with DRAM, SRAM, or any other types of memories including those that do not need to be refreshed. The main memory 164 may include multiple channels of memory devices such as Double Data Rate (DDR2) DRAMs.

The display controller 166 is any processor that provides display functionalities. The display controller 166 may also be integrated into the MCH 162 to form a Graphics and Memory Controller Hub (GMCH). The display controller 166 may be a graphics card such as the Graphics Performance Accelerator (AGP) card, interfaced to the MCH 166 via a graphics port such as the Accelerated Graphics Port (AGP) controller. The display controller 166 provides interface to a display monitor such as standard progressive scan monitor, television (TV)-out device, and Transition Minimized Differential Signaling (TMDS) controller. The display monitor may be any display device such as Cathode Ray Tube (CRT) monitor, TV set, Liquid Crystal Display (LCD), Flat Panel, and Digital CRT.

The ICH 170 has a number of functionalities that are designed to support I/O functions. The ICH 170 may also be integrated into a chipset together or separate from the MCH 162 to perform I/O functions. The ICH 170 may include a number of interface and I/O functions such as peripheral component interconnect (PCI) bus interface, processor interface, interrupt controller, direct memory access (DMA) controller, power management logic, timer, system management bus (SMBus), USB interface, mass storage interface, low pin count (LPC) interface, etc.

The interconnect 175 provides interface to peripheral devices. The interconnect 175 may be point-to-point or connected to multiple devices. For clarity, not all the interconnects are shown. It is contemplated that the interconnect 175 may include any interconnect or bus such as Peripheral Component Interconnect (PCI), PCI Express, USB, and Direct Media Interface (DMI), etc.

The mass storage interface 180 provides interface to devices that store archive information such as code, programs, files, data, and applications. The mass storage interface 180 may provide interface to a compact disk (CD) read-only memory (ROM) 182, a digital video/versatile disc (DVD) 184, a floppy drive 186, and a hard drive 188, and any other magnetic or optic storage devices. The mass storage interface 180 provides a mechanism to read machine-accessible media. The I/O devices $190_1$ to $190_K$ may include any I/O devices to perform I/O functions. Examples of I/O devices $190_1$ to $190_K$ include controller for input devices (e.g., keyboard, mouse, trackball, pointing device), media card (e.g., audio, video, graphic), network card, and any other peripheral controllers.

The cores in the processor 130 and processor unit 160 together with the interface circuit in the docking station 115 form a dynamic multi-core unit 105. The dynamic multi-core unit 105 is an example of an embodiment of the invention where the cores are in separate packages. In this embodiment, not only they are in separate packages but they are also located in separate and independent platforms.

Figure 2:
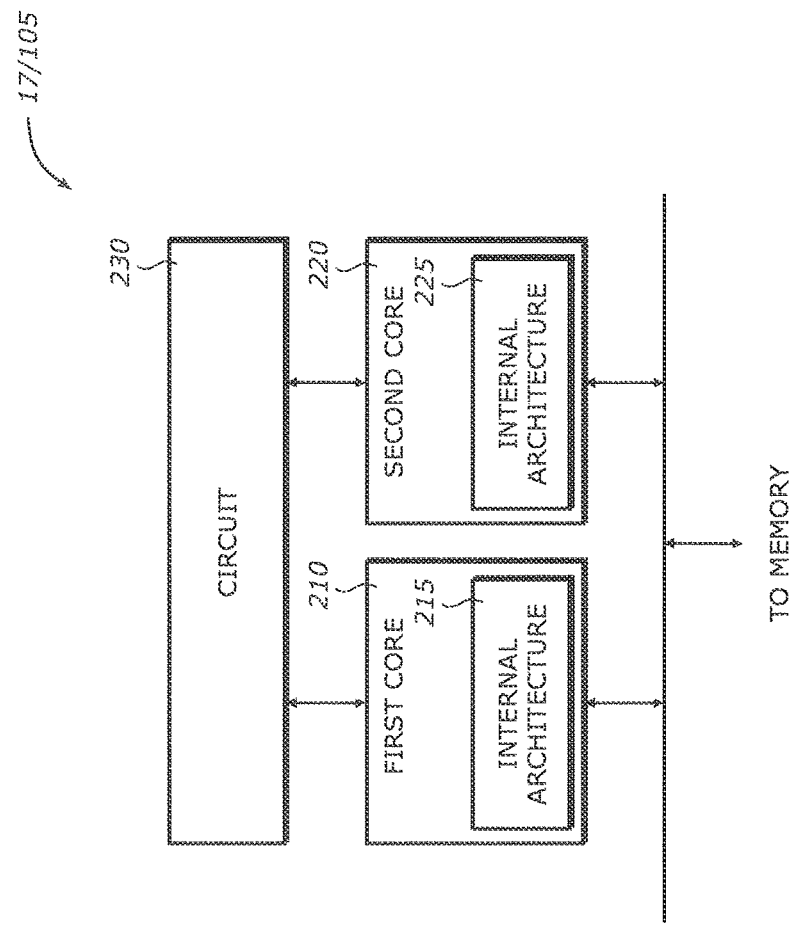
FIG. 2 is a diagram illustrating a dynamic multi-core unit according to one embodiment of the invention.

FIG. 2 is a diagram illustrating the dynamic multi-core unit 17/105 shown in FIGS. 1A and 1B according to one embodiment of the invention. The dynamic multi-core unit 17/105 includes a first core 210, a second core 220, and a logic circuit 230. Note that the dynamic multi-core unit 17/105 may include more or less than the above components. For example, there may be more than two cores, or the logic circuit 230 may be embedded in one of the first and second cores 210 and 220.

The first and second cores 210 and 220 contain the core circuits for the associated processors 15 or 130 and 170. They may be on the same die in the same package as in the processor 15 (FIG. 1A), or on separate dies in different packages. When they are in different packages, they may be located on the same platform, or on different platforms as in the processors 130 and 170 shown in FIG. 1B. They have dynamic swapping or interchange functionalities to accommodate various operating conditions such as different performance levels or different power levels.

The first core 210 has a first instruction set to execute a program at a first performance level. The first core 210 stops executing the program when a triggering event occurs. The triggering event may be any event that indicates that the first core 210 is switched out of the current program so that the second core 220 may take over and continue executing the program. The swapping of the two cores is transparent to the software. Examples of the triggering event may include an activation of a closure mechanism such as a cover of the unit, an explicit user action (e.g., pressing a button, entering a command), or a processing a load that exceeds some pre-defined threshold level. In one embodiment, the first core 210 includes a first internal architecture 215 to provide the first performance level when executing the program at a first power level.

The second core 220 has a second instruction set compatible with the first instruction set so that it may continue executing the program. It has a second performance level different than the first performance level. The performance level may be lower or higher. When the first core 210 is executing the program, the second core 220 is in a power down state. The power down state is the state where the core 220 consumes very little power or no power at all. It may be in any one of various power down states or sleep states depending on system criteria. For example, it may maintain its context including contents of registers, the lock generator (e.g., the phase-locked loop), but stop all internal clocks. It may not respond to interrupts or snoop transactions. In one embodiment, it may be compatible with a power management policy such as the Advanced Configuration and Power Interface (ACPI). It has a second internal architecture 225 to provide the second performance level lower than the first performance level when executing the program at a second power level lower than the first power level. It may also provide the second performance level higher than the first performance level when executing the program at a second power level higher than the first power level. It may also provide the second performance level approximately the same as the first performance level but with different optimized capabilities, at a second power level approximately the same as the first power level.

There are a number of methods to provide software compatibility between the two cores. In a first method, the second core 220 may execute the program using the second instruction set that is fully compatible with the first instruction set. The two instruction sets may follow some standardized and documented instruction set including a specific set of extensions such as Single Instruction Multiple Data (SIMD) extension, Streaming SIMD Extensions (SSE), or SSE2. Although the instructions sets are fully compatible, the hardware micro-architectures that implement the instructions sets may be different. For example, the same instruction may be executed with different execution times in two cores. In a second method, the second core 220 may execute the program by emulating partly or fully the first instruction set using the second instruction set. It may have support for a subset of the first instruction set, and provide emulation for the subset that it does not support. In other words, it may trap on an instruction that it does not fully support and execute a trap or handle routine that is functionally equivalent to that instruction.

The internal architectures 215 and 225 in the first and second cores 210 and 220, respectively, may have different constructions to provide different performance levels. In the embodiment shown in FIG. 1B, the first core 210 may belong to the processor 130 and the second core 220 may belong to the processor 170. The roles of the first and second cores 210 and 220 may interchange. For example, the first core 210 may provide higher performance level than the second core 220 at a higher power consumption level. The first core 210 may provide a lower performance level than the second core 220 at a lower power consumption level. When the first core 210 provides a lower performance level, it may provide full support for the second instruction set or it may support a subset of the second instruction set and emulate the instructions that it does not support as discussed above.

The circuit 230 is interfaced to both the first and second cores 210 and 220 to control their dynamic swapping or interchange. It may receive a notification of the triggering event though a number of methods depending on the nature of the triggering event. For example, if the triggering event is a global event, such as a closure or opening of a cover or lid of a mobile unit, an activation of a button or a switch, or a docking of the mobile unit on a docking station, the circuit 230 may receive the triggering event directly. If the triggering event is a local or internal event, such as when the first core 210 exceeds some pre-defined threshold in its processing load, the circuit 230 may receive the triggering event from the first core 210 either by a signal generated by the first core 210 or by status information in a designated status register.

When the circuit 230 receives the triggering event directly, it generates a signal to the first core to initiate a process to power down the first core. Upon receiving this signal, the first core starts its power down sequence. After it completes its power down sequence, it informs the circuit 230 that it is now in the power down state or ready to be in the power down state. The circuit 230 then may send a signal to power down the first core if it is not in the power down state yet. For example, the circuit 230 may assert a stop clock control signal to stop the clock on the first core. If the first core is already in the power down state such as when it executes an instruction to enter in a suspense, sleep, or power down state, the circuit 230 then powers up the second core after the first core stops executing the program such that the second core continues executing the program at the second performance level.

Figure 3:
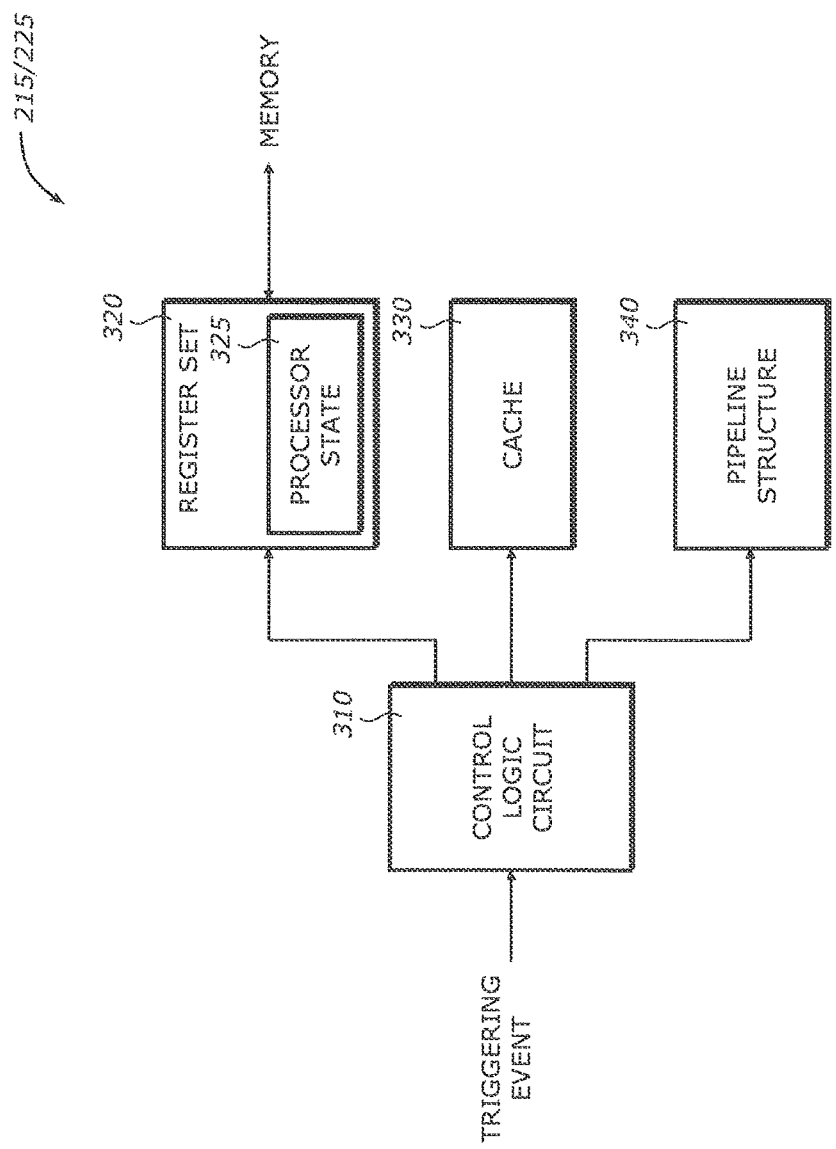
FIG. 3 is a diagram illustrating an internal architecture according to one embodiment of the invention.

FIG. 3 is a diagram illustrating the internal architecture 215/225 according to one embodiment of the invention. The cores that have the internal architectures 215 and 225 may have some identical components and some different components. The different components are those that affect the performance level and the power consumption level. The internal architectures 215/225 focus on the different components. It includes a control logic circuit 310, a register set 320, a cache 330, and a pipeline structure 340. Note that the internal architecture 215/225 may contain more or less than the above components.

The control logic circuit 310 receives a notification of the triggering event from the circuit 230 (FIG. 2) and generates control signals to the register set 320, the cache 330, and the pipeline structure 340. The control logic circuit 310 may also correspond to execution of an instruction or instructions that process the register set 320 or the cache 330. In one embodiment, the control logic circuit 310 may be optional and the triggering event may be notified by a software mechanism such as loading a status bit.

The register set 320 stores a processor state 325 that represents the state or context of the processor during program execution. It may include the basic program execution registers (e.g., general purpose registers, segment registers, flag register(s), instruction pointer register), floating point unit (FPU) registers (e.g., floating point data registers, control register, status register, tag register, op code register, FPU instruction pointer register, FPU data pointer register). It may also include various SIMD registers and extensions such as the Multimedia Extension (MMX) registers, the SSE, SSE2/SSE3 registers, etc. When the triggering event occurs, the processor state 325 in the first core 210 is saved to a memory (e.g., the memory 30, the memory 134, or the memory 164 shown in FIGS. 1A and 1B). The memory is accessible to the first and second cores 210 and 220.

The cache 330 is an internal cache. It may be a first level cache, a second level cache, or a third level cache. It may be organized in any suitable organization (e.g., 4-way, 8-way associative). During core swapping, it may be desirable to swap the cache contents as well to maintain program state. However, due to the large amount of cache in the core, cache swapping by saving to and restoring from memory may not be practical. Furthermore, the cache sizes in the cores 210 and 220 may be different. Therefore, it may be more convenient to flush the cache so that when the core is activated or powered up again, it may have to start the cache operation fresh. There may be some performance degradation at the beginning of the core swap due to cache invalidation. However, core swapping, whether from a low performance level to a high performance level or vice versa, inherently has some degradation to achieve the desired power level. When the triggering event occurs, the cache 330 may be flushed by hardware or software. The control logic circuit 310 may flush the cache 330 by asserting a flush control signal. The cache 330 may also be flushed by executing a cache flush instruction such as an invalidation instruction. The cache structure may affect the performance level and the power consumption. For a core designated to have a lower performance level, the cache size is less than the cache size in the core designated to have a higher performance level. Furthermore, the number of cache levels in the lower performance core may also be less than that in the higher performance core. The benefits of simpler and smaller cache include less complex circuitry leading to lower power consumption.

The pipeline structure 340 refers to any pipeline structure in the core. It may be an instruction pipeline or a data pipeline. The depth of the pipeline may affect the performance level at the expense of more complex circuitry and more power consumption. Similar to the cache circuit, for a core designated to have a lower performance level, the pipeline depth is less than the pipeline depth in the core designated to have a higher performance level. Furthermore, the number of pipelines in the lower performance core may also be less than that in the higher performance core. The benefits of simpler pipeline structure include less complex circuitry leading to lower power consumption. The pipeline structure 340 may be a fixed circuit that is designed according to the performance level offered by the corresponding core.

After the processor state is saved and the cache is flushed, the first core 210 executes a suspense instruction to enter a suspense or power down state. When the second core 220 is powered up to resume program execution, it restores the processor state from the memory by transferring the contents of the saved processor state to its register set. It then begins program execution using the restored processor state.

Figure 4:
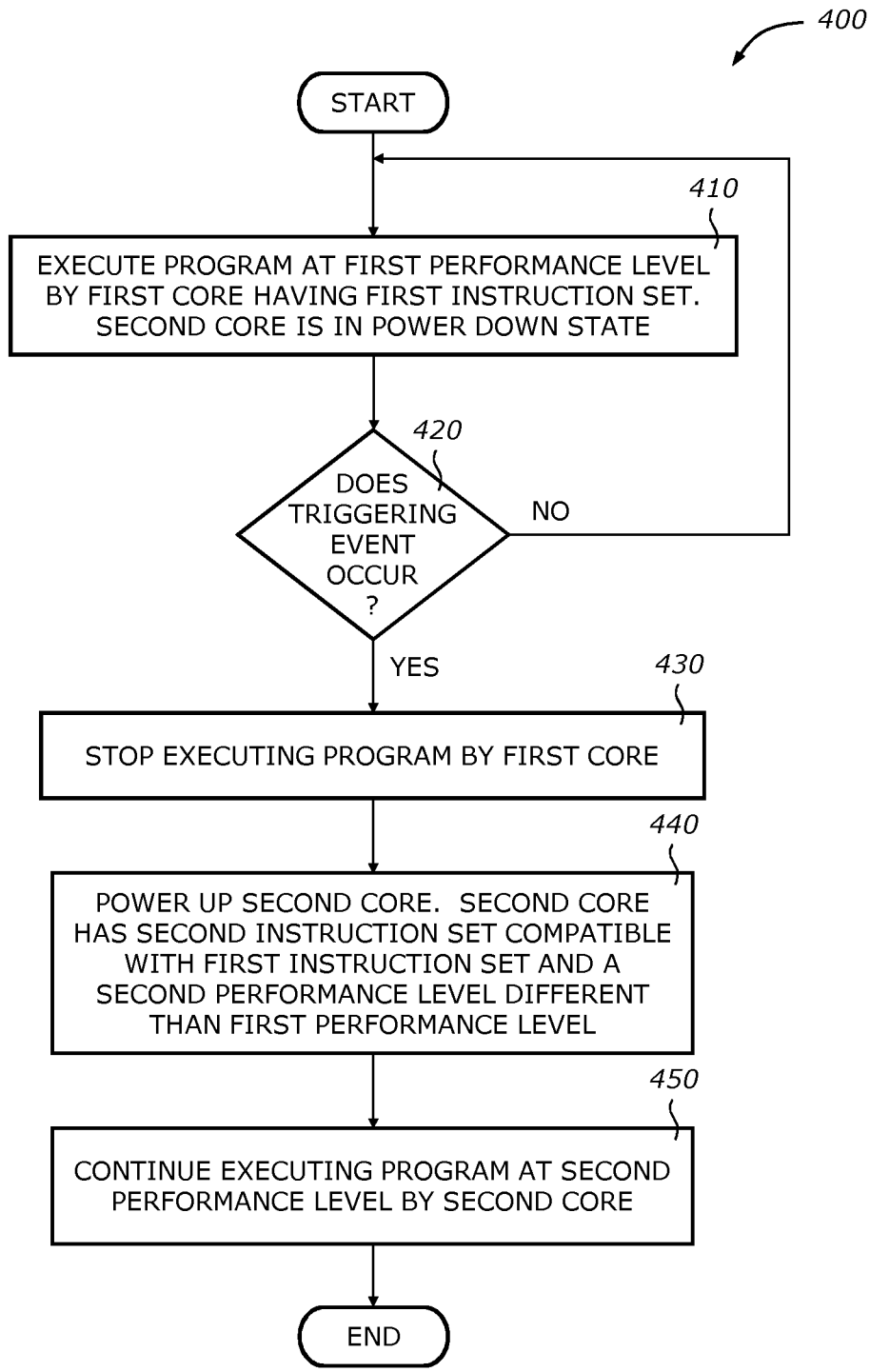
FIG. 4 is a flowchart illustrating a process to dynamically swap cores according to one embodiment of the invention.

FIG. 4 is a flowchart illustrating a process 400 to dynamically swap cores according to one embodiment of the invention.

Upon START, the process 400 executes a program at a first performance level by a first core having a first instruction set (Block 410) During this time, the second core is in a power down state. Then, the process 400 determines if a triggering even occurs (Block 420). The triggering event may be any event that causes the core swapping, such as closure or opening the unit cover, activation of a button or switch, or an internal load processing state. If there is no triggering event, the process 400 returns to Block 410 to continue executing the program by the first core. Otherwise, the process 400 stops executing the program by the first core (Block 430).

Then, the process 400 powers up a second core after the first core stops executing the program (Block 440). The second core has a second instruction set compatible with the first instruction set and has a second performance level different than the first performance level. Next, the process 400 continues executing the program at the second performance level by the second core (Block 450) and is then terminated.

Figure 5:
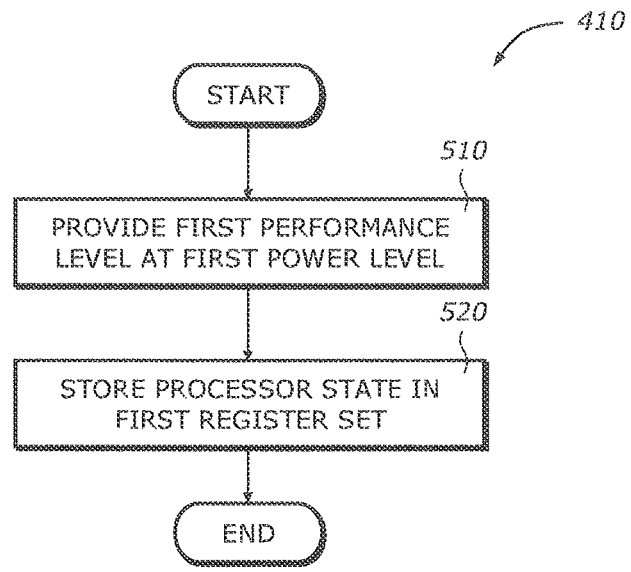
FIG. 5 is a flowchart illustrating a process to execute a program by first core according to one embodiment of the invention.

FIG. 5 is a flowchart illustrating the process 410 shown in FIG. 4 to execute a program by the first core according to one embodiment of the invention.

Upon START, the process 410 provides the first performance level at a first power level (Block 510). The first performance level depends on the internal architecture of the first core. The first power level is a function of the first performance level. If the first performance level is high, the first power level is also high. Otherwise, it is low. Next, the process 520 stores a processor state in a first register set (Block 520). The storing of the processor state typically takes place as part of the normal program execution. The process 410 is then terminated.

Figure 6:
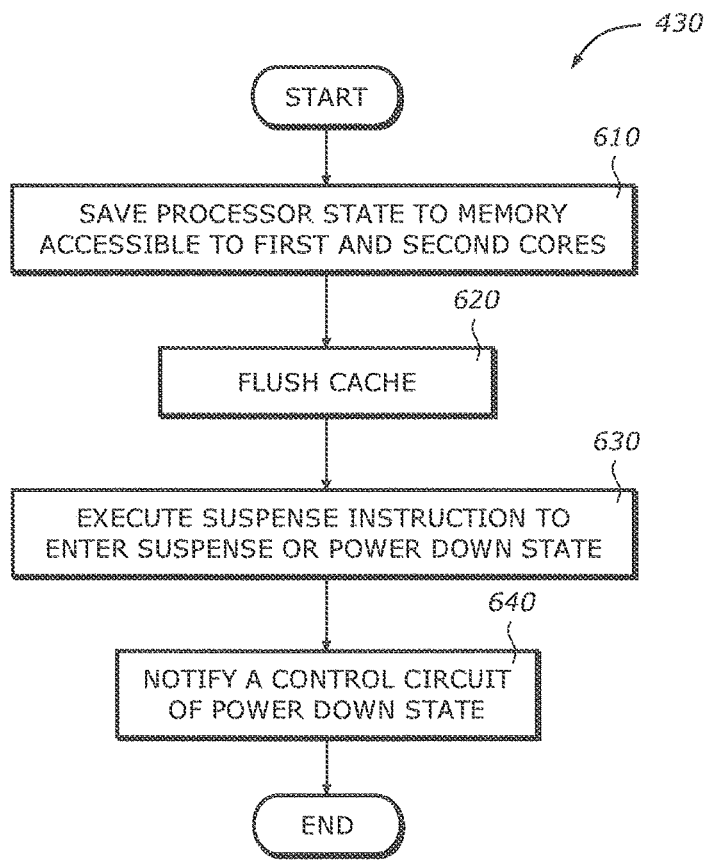
FIG. 6 is a flowchart illustrating a process to stop executing a program by first core according to one embodiment of the invention.

FIG. 6 is a flowchart illustrating the process 430 shown in FIG. 4 to stop executing a program by first core according to one embodiment of the invention.

Upon START, the process 430 saves the processor state to a memory (Block 610). The memory is accessible to the first and second cores. Then, the process 430 flushes a cache internal to the core (Block 620). This may be performed by asserting a flush control signal or by executing a cache flush or invalidation instruction. Then, the process 430 executes a suspense instruction by the first core to enter a suspense, sleep, or power down state (Block 630). Next, the process 430 notifies a control circuit of the power down state (Block 640). This may be performed by generating a status signal or writes or updates status information in a status register that may be checked by the control circuit. The process 430 is then terminated.

Figure 7:
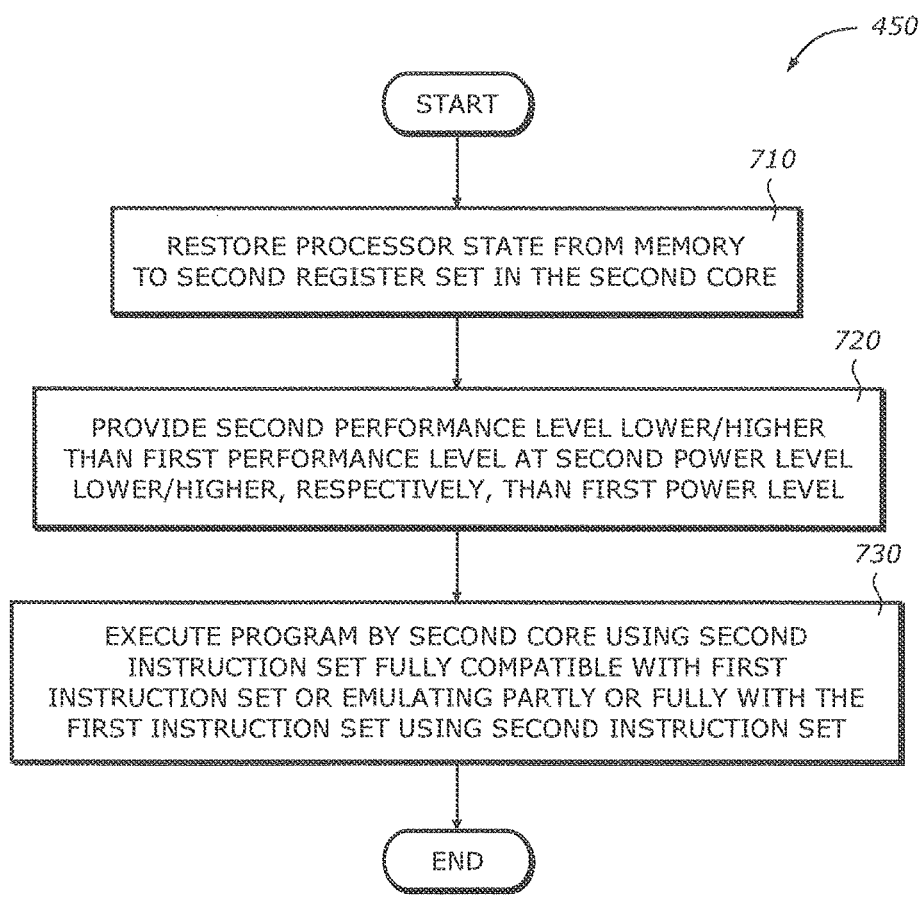
FIG. 7 is a flowchart illustrating a process to continue executing a program by second core according to one embodiment of the invention.

FIG. 7 is a flowchart illustrating the process 450 shown in FIG. 4 to continue executing a program by second core according to one embodiment of the invention.

Upon START, the process 450 restores the processor state from the memory to a second register set after the second core is powered up (Block 710). This may be performed by transferring the saved processor state at some designated memory locations to the register set in the second core. Next, the process 450 provides the second performance level lower or higher than the first performance level at a second power level lower or higher, respectively, than the first power level (Block 720). Then, the process 450 executes the program using the second instruction set that is fully compatible with the first instruction set or emulating partly or fully the first instruction set by the second core using the second instruction set (Block 730). Normally, the second core emulates the first instruction set when it is designated as a lower performance core. The process 450 is then terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

The invention claimed is:

1. A system comprising:
a memory controller to perform memory control functions;
a graphics processor coupled to the memory controller, the graphics processor to perform graphics processing; and
a plurality of processor cores coupled to the memory controller, the plurality of processor cores including a first core and a second core to execute a program at different performance levels and different power levels;
wherein the first core and the second core have different micro-architectures, including different pipeline depths, and wherein an instruction set of the first core and an instruction set of the second core are based on a single instruction set including single instruction multiple data (SIMD) instructions; and
wherein the first core and the second core are integrated on a single die, and wherein the first core is to provide a first performance level when executing the program at a first power level and at a first frequency and the second core is to provide a second performance level higher than the first performance level when executing the program at a second power level higher than the first power level and at a second frequency higher than the first frequency;
wherein, in response to a triggering event, the second core is to continue execution of the program at the second performance level after first core discontinues execution of the program.

2. The system of claim 1, further comprising a universal serial bus (USB) controller to support a USB interface to a device.

3. The system of claim 1, further comprising a Bluetooth controller to enable wireless functionality through a short-range radio link to communicate with Bluetooth-enabled devices.

4. The system of claim 1, wherein the triggering event is based on a processing load of first core.

5. The system of claim 1, wherein, in response to the triggering event, the processor is to initiate a process to power up the second core, save state information of the first core and restore the state information to the second core.

6. The system of claim 1, wherein, in response to the triggering event, the first core is to enter a power down state, a sleep state, or a suspend state.

7. The system of claim 1, further comprising a read only memory having stored therein boot code to boot the system upon power-up.

8. The system of claim 1, further comprising dynamic random access memory to store instructions or data.

9. The system of claim 1, further comprising a wireless interface logic to enable wireless connection to a wireless network.

* * * * *